United States Patent [11] 3,577,900

| [72] | Inventors | Dean M. Peterson<br>Littleton, Colo.;<br>Charles E. Pickering, Irondequoit; Fredric<br>A. Mindler, Rochester, N.Y. |
|---|---|---|
| [21] | Appl. No. | 744,784 |
| [22] | Filed | July 15, 1968 |
| [45] | Patented | May 11, 1971 |
| [73] | Assignee | Eastman Kodak Company<br>Rochester, N.Y. |

[54] FILM-METERING AND DOUBLE-EXPOSURE PREVENTION MECHANISM FOR PHOTOGRAPHIC CAMERA
5 Claims, 11 Drawing Figs.

| [52] | U.S. Cl. | 95/31 |
|---|---|---|
| [51] | Int. Cl. | G03b17/42, G03b 19/04, G03b 1/42 |
| [50] | Field of Search | 95/31 (Misc), 31 (ACFS), 31 (FSL), (Inquired) |

[56] References Cited
UNITED STATES PATENTS

| 3,148,605 | 9/1964 | Peterson et al. | 95/31 |
|---|---|---|---|
| 3,237,542 | 3/1966 | Ataka | 95/31 |
| 3,473,456 | 10/1969 | Peterson et al. | 95/31 |

*Primary Examiner*—Samuel S. Matthews
*Assistant Examiner*—M. L. Gellner
*Attorneys*—Robert W. Hampton and Ronald S. Kareken

ABSTRACT: A double-exposure prevention device for a camera having a lockable film advance includes a trigger which is blocked to prevent a second exposure by an element controlled by a spring whose controlling function is adjustable by the mechanism in the camera which locks film advance.

Patented May 11, 1971

DEAN M. PETERSON
CHARLES E. PICKERING
FREDRIC A. MINDLER
INVENTORS

BY
ATTORNEYS

Patented May 11, 1971

DEAN M. PETERSON
CHARLES E. PICKERING
FREDRIC A. MINDLER
INVENTORS

BY
ATTORNEYS

Patented May 11, 1971

DEAN M. PETERSON
CHARLES E. PICKERING
FREDRIC A. MINDLER
INVENTORS

BY
ATTORNEYS

FILM-METERING AND DOUBLE-EXPOSURE PREVENTION MECHANISM FOR PHOTOGRAPHIC CAMERA

CROSS-REFERENCES TO RELATED APPLICATIONS

Reference is made to the following commonly assigned patents:

U.S. Pat. No. 3,473,456 issued Oct. 21, 1969, entitled PHOTOGRAPHIC CAMERA WITH METERED FILM ADVANCE AND DOUBLE EXPOSURE PREVENTION, Dean M. Peterson et al.

U.S. Pat. No. 3,504,605 issued Apr. 7, 1970, entitled PHOTOGRAPHIC CAMERA WITH RETRACTILE LENS HOUSING, James F. Scudder et al.

U.S. Pat. No. 3,440,939 issued Apr. 29, 1969, entitled PHOTOGRAPHIC CAMERA WITH RETRACTILE LENS AND SHUTTER TRIGGER, Dean M. Peterson et al.

BACKGROUND OF THE INVENTION

1. Field of the Invention

The present invention relates to film-metering and double-exposure prevention systems for photographic cameras and more specifically to such systems which are particularly suitable for roll film cameras including power-operated or motor-driven film-advancing means.

2. Description of the Prior Art

It is well known to provide a roll film camera with a film-advancing mechanism including a film-metering device having a blocking element movable to engage a film-winding member following each successive advancement of the film by a predetermined distance and to release the winding member in response to movement of the shutter trigger after shutter operation. In such an arrangement, it is also known to prevent accidental double exposure of the film by providing the camera with a trigger-disabling member movable by the above-mentioned blocking element into and out of the path of movement of the trigger to control trigger operation.

In a camera in which the film is advanced manually by a winding knob or lever, the blocking element physically prevents further manual movement of the knob when the film has been advanced sufficiently for another exposure. Thereupon, the operator releases the knob and effects an exposure by depressing the trigger, which has been released by the disabling member upon movement of the blocking element into engagement with the winding member. While engagement of the blocking element with the winding member is resisting the manual effort applied to the knob, substantial force may be developed between those two components. However, since this force is relieved as soon as the operator releases the knob, the blocking element can be disengaged easily from the winding member by the return movement of the trigger by a return spring to its initial position following shutter operation. Furthermore, since the operator performs each film-advancing operation manually, he probably would not attempt to operate the trigger while winding film. Simultaneous operation could cause a trapping of the disabling member by the trigger to prevent proper movement of the blocking element into engagement with the winding member.

A power-operated camera of the type to which the present invention relates includes the same general type of mechanism described above, but substitutes a spring-wound motor or the like for the manually operated winding knob or lever. In such a construction, the force of the winding motor is opposed by engagement of the blocking element with the winding member, thus continuing to develop considerable force between those components so long as such engagement continues. Therefore, the force which must be applied to the blocking element to disengage it from the winding member in response to return movement of the trigger may exceed that which can be produced by the trigger return spring without increasing the strength of that spring to an extent prejudicial to proper camera operation. Furthermore, since such a camera can produce exposures in rapid succession without intervening manual film advancement, the operator may attempt to operate the trigger a second time before the film has been completely advanced. Such an attempt could cause the entire roll of film to wind through the camera by preventing the blocking element from properly engaging the winding member.

SUMMARY OF THE INVENTION

The present invention overcomes these two problems in a power-operated camera by simple and reliable means that insures proper functioning of the camera regardless of the manner in which the camera trigger is operated. In accordance with a preferred embodiment of the invention, there is provided a spring-loaded impact device which is released by the trigger to disengage the blocking element from the winding member and yieldable means operatively connecting the blocking element to the disabling member to allow the blocking element to engage the winding member even though the disabling member may be trapped by the trigger.

As such, the preferred embodiment may comprise a power-operated version of the camera disclosed and claimed in U.S. Pat. No. 3,473,456 issued Oct. 21, 1969, entitled PHOTOGRAPHIC CAMERA WITH METERED FILM ADVANCE AND DOUBLE EXPOSURE PREVENTION and U.S. Pat. No. 3,440,939 issued Apr. 29, 1969, entitled PHOTOGRAPHIC CAMERA WITH RETRACTILE LENS AND SHUTTER TRIGGER.

BRIEF DESCRIPTION OF THE DRAWINGS

The invention, as well as objects and advantages thereof, will become more apparent from the following description of the preferred embodiment, the accompanying drawing forming a part thereof and wherein.

DESCRIPTION OF THE PREFERRED EMBODIMENT

Figure 1:
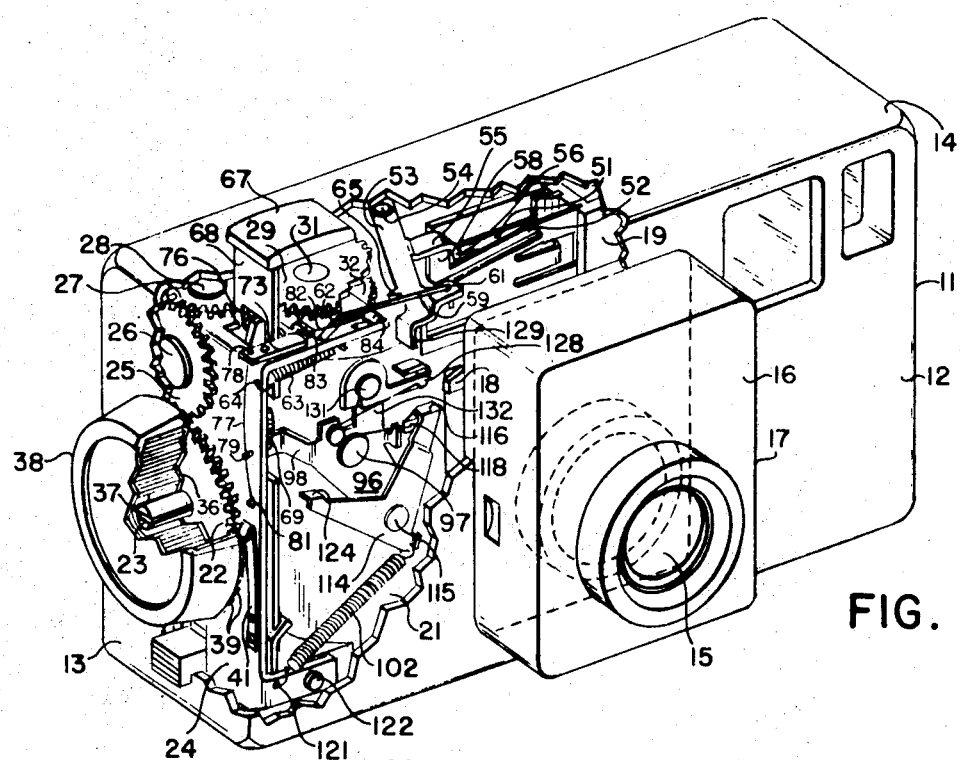
FIG. 1 is a perspective view of a camera embodying the invention, with portions broken away to show internal construction.

Referring now to FIG. 1 of the drawings, the subject camera comprises a body housing 11 including a front wall 12, and end wall 13 and a top wall 14. The image-forming objective lens 15 of the camera is supported by the forward wall 16 of the lens housing 17, which also houses the camera shutter (not shown) operated in a manner known per se by upward movement of shutter lever 18. The lens housing and its associated structures may be supported for retractile movement relative to body housing 11 between the extended operating position shown in sold lines to the retracted carrying position illustrated in broken lines. In one example of such a construction disclosed in commonly assigned U.S. Pat. No. 3,504,605 issued Apr. 7, 1970, entitled PHOTOGRAPHIC CAMERA WITH RETRACTILE LENS HOUSING, resilient means are employed to move the lens housing to its extended position upon release of an appropriate latch mechanism. However, since the present invention does not involve the particular structure employed for supporting and moving the retractile lens housing 17, such details are not shown.

A main support member or frame 19, which is formed preferably of molded plastic or die cast metal, is enclosed within body housing 11 and includes a curved wall portion 21 defining, rearwardly thereof, a compartment for the film takeup spool or the film takeup chamber of a film magazine. A similar curved wall portion, not shown, is provided at the opposite end of the support member, to define a similar compartment for the film supply spool or the corresponding film supply chamber of a film magazine.

FILM-WINDING MECHANISM

The film-winding mechanism of the camera comprises a gear 22 attached to a shaft 23 rotatably supported on the vertical portion of a support plate 24 adjacent end wall 13 of the camera housing. Gear 22 meshes with rotatable vertical idler gear 25, which also is supported on the vertical portion of support plate 24 by a bearing member 26. A horizontal idler gear 27 is rotatably supported atop the horizontal portion of support plate 24 by a bearing member 28, with its teeth meshing at right angles with those of vertical idler gear 25. Horizontal idler gear 27 also meshes with a second horizontal gear 29, affixed to vertical shaft 31 extending through and rotatably supported by the horizontal portion of plate 24.

Below the horizontal portion of support plate 24, shaft 31 is connected in rotatable driving relation to a ratchet wheel 32 and to the film takeup spool positioned coaxially thereof, as shown at 33 in FIGS. 2, 3 and 4. If desired, the means employed to connect the film takeup spool to shaft 31 may be movable into and out of engagement with the spool in response to operation of a cover door-latching mechanism as disclosed, for example, in U.S. Pat. No. 3,106,142.

Figure 2:
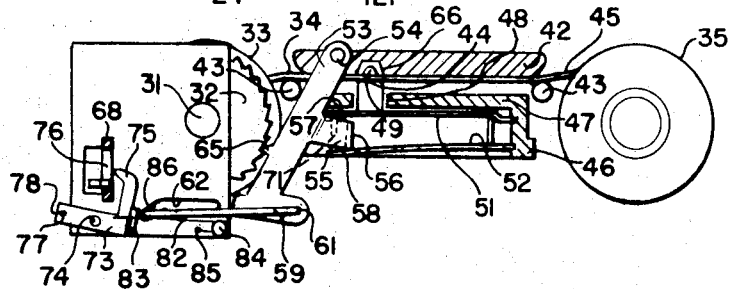
FIG. 2 is a top plan view of the film-metering and double-exposure prevention component of the camera, such components being shown in their respective positions after film advancement and before shutter operation.
Figure 3:
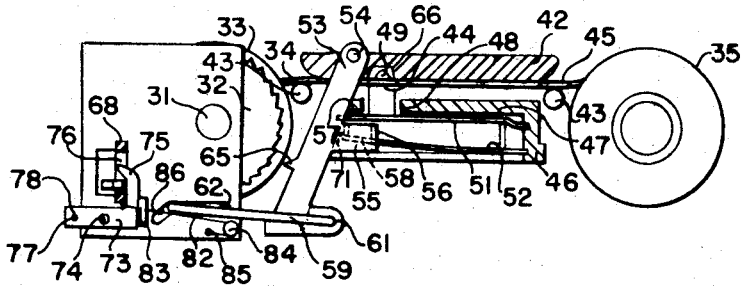
FIG. 3 corresponds to FIG. 2 and shows the components shown in their respective positions after shutter operation but before the film has been advanced.
Figure 4:
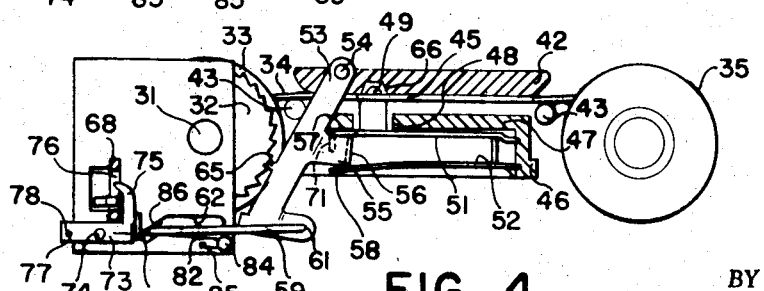
FIG. 4 corresponds to FIGS. 2 and 3 and shows the components in their possible positions if the operator were to depress the shutter trigger a second time during film advancement.

From the foregoing description, clockwise rotation of gear 22 as viewed in FIGS. 1 through 4, imparts counterclockwise motion to shaft 31 and film takeup spool 33, thereby winding the elongate film strip 34 onto the takeup spool from the film supply spool 35. It should be noted, however, that the illustration of conventional film supply and takeup spools in FIGS. 2 through 4 is for illustrative purposes only, inasmuch as the film may be housed in a film magazine.

As hereinafter described in greater detail, the film-metering mechanism allows ratchet wheel 32 to rotate in a counterclockwise direction only when such rotation is required to advance the film a predetermined distance following an exposure thereof. Therefore, if constant clockwise torque is applied to gear 22, film-advancing rotation of the film takeup spool will occur whenever the metering mechanism allows the ratchet wheel to rotate in a counterclockwise direction.

To supply such torque to gear 22, the illustrative embodiment of the invention is provided with a spring motor comprising a barrel member 36 rotatably supported on shaft 23 and enclosing a spirally wound spring 37, which is attached to shaft 23 and to the cylindrical wall of the barrel at its respective inner and outer ends. The barrel member, in turn, is housed within a hollow knob member 38 in driving engagement with the barrel. Along the edge of its skirt portion, the knob member 38 is provided with a series of ratchet teeth 39 unidirectionally engageable by a pawl finger 41 attached to support plate 24 to prevent counterclockwise movement of the barrel and knob members. Accordingly, when the knob member is rotated manually in a clockwise direction, the ratchet wheel is prevented from turning. This motion winds spring 37 to store energy thereafter available to advance the film following successive exposures thereof.

FILM-METERING MECHANISM

The film-metering mechanism of the subject camera is basically similar to the corresponding mechanism disclosed in greater detail in the above-cited pending application Ser. No. 610,110. In this construction, the portion of the film strip between the film spools 33 and 35 is supported in flat condition in the focal plane of the extended camera lens against a flat backing plate 42, by film guide members 43 as shown in FIGS. 2, 3 and 4. As previously discussed, however, the backing plate and the film guide members need not be incorporated in the camera itself, but may comprise elements of a film magazine. The upper edge of the film strip 34 is provided with a plurality of metering holes, two of which are shown at 44 and 45. Each such metering hole bears a predetermined relation to the adjacent film exposure area associated therewith. In front of the metering hole edge of the film strip 34, the main support member 19 defines a boxlike structure 46 including a rearward wall member 47 provided with a metering pawl opening 48. This opening is adapted to accommodate a rounded metering pawl 49 projecting rearwardly from the free end of resilient pawl arm 51, which is located within structure 46 behind a similar resilient tongue member 52.

A blocking element in the form of latch arm 53 is pivotally supported on member 19, or on another stationary element of the camera, by a pivot member 54. This arm includes a latching projection 55 provided with a depending latching ear 56 adjacent ears 57 and 58 extending upwardly from the respective free ends of the resilient pawl member and the resilient tongue member. At its forward end, latch arm 53 is connected to a wire linking member 59 extending downwardly in hooklike fashion through hole 61. The opposite end of the linking member is bent downwardly in a similar manner and extends through a slot 62 in the horizontal portion of support plate 24. Beneath the support plate, the hooklike end of the linking member 59 is attached to a light tension spring 63, shown in FIG. 1, which is connected at its opposite end to the vertical portion of support plate 24 at hole 64.

FIG. 2 illustrates the respective positions of the various components of the film-metering mechanism after the film strip has been advanced but before the shutter has been operated to expose the film exposure area then aligned with the camera lens system. At this stage of camera operation, latch arm 53 is positioned with its pawl tooth 65 engaged with an adjacent tooth of ratchet wheel 32, thereby precluding the spring motor from further advancing the film.

As also shown in FIG. 2, metering hole 44 in the film strip is now aligned with metering pawl 49, thus allowing the pawl to project through the film and into recess 66 in backing plate 42. Accordingly, ear 57 at the free end of resilient pawl arm 51 is located behind the rearward edge of latch arm ear 56, the opposite forward edge of which is resiliently engaged by the similar ear 58 of tongue member 52.

To operate the camera shutter, as will be explained in greater detail, the operator manually depresses trigger shoe 67 to slide trigger member 68 downwardly against the resistance of return spring 69. During that operation, the operative components of the film-metering mechanism remain in the respective positions shown in FIG. 2 to prevent movement of the film while the shutter is functioning. When the operator releases the depressed trigger shoe, however, the resulting upward movement of the trigger member by spring 69 causes the hereinafter-described impact reset mechanism to drive latch arm 53 to the position shown in FIGS. 1 and 3 where it is momentarily retained against the influence of spring 63 by the engagement of depending ear 56 with the inner edge of tongue member ear 58. Since such displacement of the latch arm disengages its tooth 65 from the ratchet wheel, the wound motor-drive spring 37 immediately begins to rotate the film takeup spool 33 to advance the film strip by winding the film onto that spool. Consequently, metering hole 44 moves out of alignment with metering pawl 49 as the edge of the metering hole engages the adjacent sloped edge of the pawl and cams the pawl forwardly to a position in which the pawl bears against the forward surface of the film strip between the metering holes. As the free end of the pawl member moves to this forward position, the corresponding end of the tongue member 52 is displaced forwardly by lug 71 extending rearwardly from the pawl arm; thereby moving tongue member ear 58 out of engagement with depending ear 56. Accordingly, spring 63 moves the latch arm 53 to an intermediate position defined by the abutment of depending ear 56 against the adjacent edge of pawl arm ear 57. In this intermediate position, latch tooth 65 is still out of engagement with the ratchet wheel 32, which continues to rotate to advance the film strip.

When the continuing advancement of the film strip has moved the next metering hole 45 into alignment with the metering pawl 49, it again assumes its previous position under the resilient influence of pawl arm 51, thereby disengaging ear 57 from depending ear 56. Due to the previous movement of the latch arm to its intermediate position, tongue member ear 58 is now aligned with the forward edge of depending ear 56. Therefore, spring 63 can now return the latch arm to its former position shown in FIG. 2, so that tooth 65 is again engaged with ratchet wheel 32 to block further winding of the film.

DOUBLE-EXPOSURE PREVENTION MECHANISM

The mechanism employed to prevent a double exposure of a film area comprises a trigger-blocking member 73 shown in FIGS. 1 through 7, pivotally attached to the horizontal portion of support plate 24 by a pivot pin 74. When the blocking member is in the position shown in FIGS. 1, 3 and 4, nose portion 75 thereof extends into rectangular hole 76 in trigger member 68 to block depression of that member; whereas when the blocking member is positioned as shown in FIGS. 2, 5, 6 and 7, the nose portion is retracted from hole 76 to allow depression of the trigger member.

The blocking member is biased in a direction tending to withdraw its nose portion from hole 76 by a vertical wire spring 77, passing through hole 78 in the blocking member and supported by pins 79 and 81 on support plate 24. Except when the latch arm 53 is in blocking engagement with the ratchet wheel 32, however, the resilient force of spring 77 is over powered by an opposite force exerted on the blocking member by horizontal wire spring 82 engaged with ear 83 of that member and attached at its opposite end to the support plate by extending around rivet 84 and projecting downwardly through hole 85. Thus, it will be apparent that the blocking member prevents the trigger from being depressed while the film is in the process of being advanced. When the next metering hole is moved into alignment with the metering pawl, however, the resulting movement of the latch arm toward the ratchet wheel under the influence of spring 63 is accompanied by forward movement of the end of linking member 59 adjacent the blocking member, as that end of the linking member enters the sloped portion 86 of the slot. Consequently, spring 82 is engaged by the linking member and thereby displaced in a forward direction as shown in FIG. 2; thus relieving the blocking member of the resilient influence of that spring, so that it will be pivoted out of blocking relation to the trigger member by the weaker vertical spring 77.

In the double-exposure prevention system disclosed in the aforementioned U.S. Pat. No. 3,473,456, a similar blocking member is resiliently biased toward engagement with the trigger member and is retracted by direct engagement with the adjacent end of the linking member as the latter moves into the sloped portion of its guide slot. As previously mentioned, such a mechanism may be subject to malfunctioning if the operator attempts to depress the trigger a second time while the film is advancing; thereby trapping the blocking member and preventing the linking member from entering the sloped portion of the slot. The same occurrence in the operation of the present camera will likewise trap the blocking member as long as the trigger member is urged downwardly by the operator. However, as shown in FIG. 4, the latch arm 53 nevertheless may engage the ratchet wheel 32 because linking member 59 can enter the sloped portion of slot 62 by displacing the free end of horizontal spring 82. Therefore, when the trigger is subsequently released, vertical spring 77 again restores the blocking member to the withdrawn position shown in FIGS. 2, 5, 6 and 7, so that the trigger can be depressed again to operate the shutter.

SHUTTER TRIGGER ASSEMBLY

Figure 5:
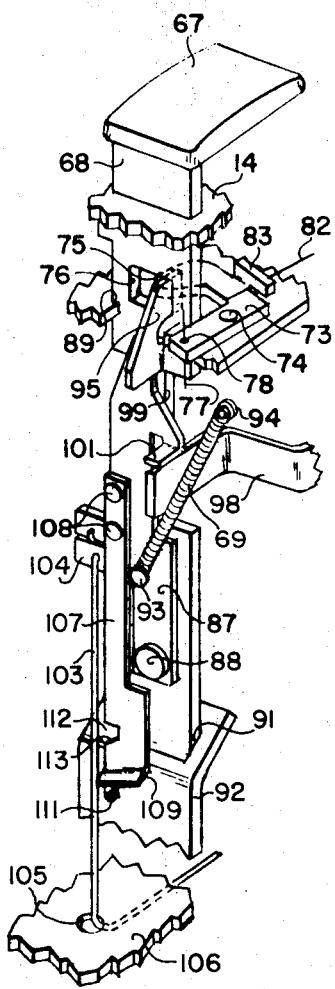
FIG. 5 is an enlarged, partial perspective view of the trigger mechanism of the camera according to the invention, showing the shutter-actuating lever and a trigger-blocking member with the trigger in its extended position.
Figure 6:
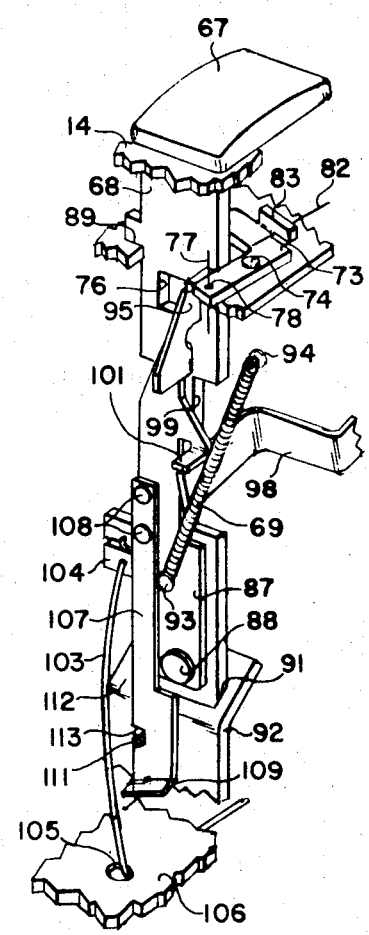
FIG. 6 corresponds to FIG. 5 and illustrates the trigger mechanism while the trigger is depressed to operate the camera shutter.
Figure 7:
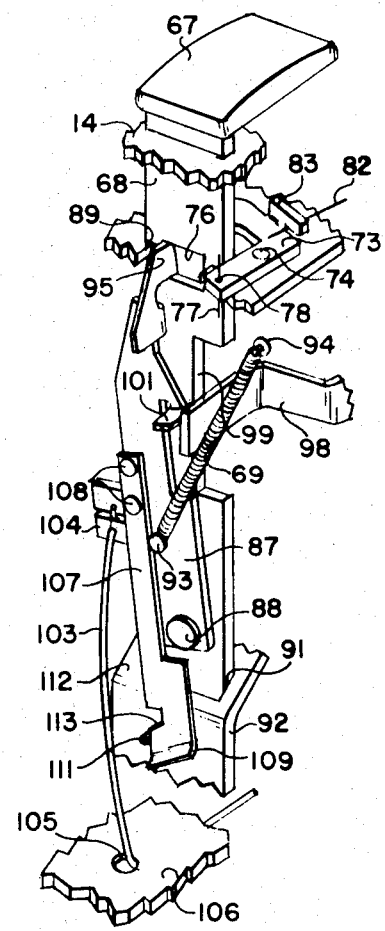
FIG. 7 corresponds to FIGS. 5 and 6 and illustrates the trigger mechanism as the trigger is returning from its depressed position to its extended position.

The trigger assembly of the subject camera, best illustrated in FIGS. 5, 6 and 7, comprises trigger member 68 and latch member 87 pivotally attached to the trigger member by a pivot pin 88. The trigger member is slidably positioned in an opening 89 in the horizontal portion of support plate 24 and in another opening 91 in stationary lower support member 92. Trigger spring 69 extends angularly between pin 93 on the latch member and pin 94 on support plate 24; thereby urging the trigger member upwardly and also biasing the latch member toward its vertical position in which tongue 95 is engaged with the forward edge of rectangular hole 76 as depicted in FIGS. 5 and 6.

As best shown in FIGS. 1 and 8 through 11, shutter-operating member 96 is pivotally attached to support member 19 by stud 97 and includes an arm 98 extending through slot 99 along the forward edge of the trigger member. Whenever the latch member is in its vertical position, i.e., in parallel relation to the trigger member, ear 101 on the latch member is located directly above the outer end of arm 98. Therefore, as the trigger is depressed from its raised position to a position in which trigger shoe 67 is adjacent the camera body casing, ear 101 engages arm 98 and operates the camera shutter by rotating member 96 against the influence of spring 102 from the position shown in FIG. 8 to the position shown in FIG. 10.

The construction of the trigger assembly described above corresponds to that disclosed in the above-cited U.S. Pat. No. 3,440,939, and enables the trigger shoe to assume automatically its depressed position in response to retraction of the lens assembly, without thereby operating the shutter. For that purpose, a flexible cord 103 is connected at one end to arm 104 projecting rearwardly from the latch member and extends downwardly through a guide hole 105 in internal bottom wall member 106. At its opposite end, the cord is operatively connected to lens housing 17 by means of a lever mechanism, not shown, which is adapted to pull on the cord as the lens housing is retracted. When this occurs, the angular relation between arm 104, pivot pin 88 and spring 69 causes the latch member to pivot initially about pin 88 to a position in which tongue 95 is engaged with the rearward edge of hole 76, thereby displacing the nose portion of the trigger-blocking member from that hole if the blocking member is so positioned. Thereupon, the tension of the cord pulls the trigger member downwardly but does not effect operation of the shutter inasmuch as ear 101 is positioned out of alignment with arm 98 as in the case illustrated in FIG. 7. Upon the return of the lens housing to its extended position, the trigger member is again raised by spring 69, which also restores the vertical position of the latch member, As long as the lens housing is extended, cord 103 merely slackens as the trigger member is depressed and in no way influences the operation of the camera.

In addition to the elements of the trigger assembly just described, the present invention also provides latch member 87 with a resilient cam arm 107 extending downwardly from the latch member and attached thereto by rivets 108. At its lower end, the cam arm is bent to define a sloped lip 109 which is positioned above a stationary pin 111 on support member 92 when the trigger member is in its raised position illustrated in FIG. 5.

As the trigger is depressed, spring 69 maintains the latch member in parallel relation to the trigger member so that ear 101 engages and depresses arm 98 on shutter-operating member 96, thus operating the shutter as described below.

As the trigger member moves downwardly, the sloped lip 109 of the cam arm 107 rides over pin 111 by flexing the resilient arm. Accordingly, when the trigger member reaches its lowermost position, pin 111 is received in notch 112 in the cam arm, which has thus far remained in parallel relation with the trigger member. As soon as the operator releases the trigger shoe, however, the resulting upward movement of the trigger member of spring 69 causes the lower end of the cam arm to be deflected toward the front of the camera by the engagement of the sloped lower edge 113 of notch 112 with pin 111. By the time the trigger shoe has been raised only slightly above the camera casing, the latch member is displaced to the position shown in FIG. 7 in which ear 101 is disengaged from arm 98 of the shutter-operating member. Consequently, the shutter-operating member is returned almost instantaneously to its initial position by spring 102 as the trigger member commences to move upwardly, regardless of the speed of movement of the latter member. This operation is instrumental to the performance of the subsequently explained impact reset mechanism of the present invention. As the trigger member approaches its raised position, the lower end of the cam arm disengages pin 111, thus allowing the latch member to return to its vertical position. Therefore, upon completion of its upward movement, the trigger assembly is restored to the condition shown in FIG. 5, but is temporarily blocked from being depressed again by blocking member 73.

Since the operation of the trigger retraction mechanism by rearward movement of the lens housing displaces the latch member to the same position shown in FIG. 7, it will be apparent that cam arm 107 and pin 111 in no way interfere with the operation of that mechanism. Likewise, if another version of the same camera is not provided with the retractile trigger feature, the identical trigger assembly can nevertheless be employed to reduce production costs.

SHUTTER-OPERATING MECHANISM

To minimize the space required within the camera to accommodate the retracted lens housing and the shutter lever 18 supported thereby, lever 18 is located rearwardly of the lens housing with the end of the lever substantially in alignment with the adjacent lateral wall surface of the housing. Accordingly, the member employed to engage and raise the shutter lever 18 to actuate the shutter must be movable out of rearward alignment with the lens housing to allow retraction thereof. As best illustrated in FIGS. 1 and 8 through 11, this is accomplished by pivotally attaching an intermediate lever 114 to shutter-operating member 96 by means of a pivot member 115. When the mechanism is in the position shown in FIGS. 1 and 8, the horizontal lip 116 of the nose portion 117 of intermediate lever 114 is maintained against the upper surface of support projection 118 on member 19 by spring 102, which extends between ear 119 on the intermediate lever and hole 121 in mounting arm 122 of support plate 24. In this position, nose 117 of lever 114 is laterally out of alignment with shutter lever 18 and with the path of movement of the lens housing during its retraction. Since lip 116 is supported by projection 118, the force exerted by spring 102 tends to exert a clockwise influence on member 96 through pivot member 115, thereby resiliently maintaining member 96 in its illustrated position as previously indicated.

Figure 10:
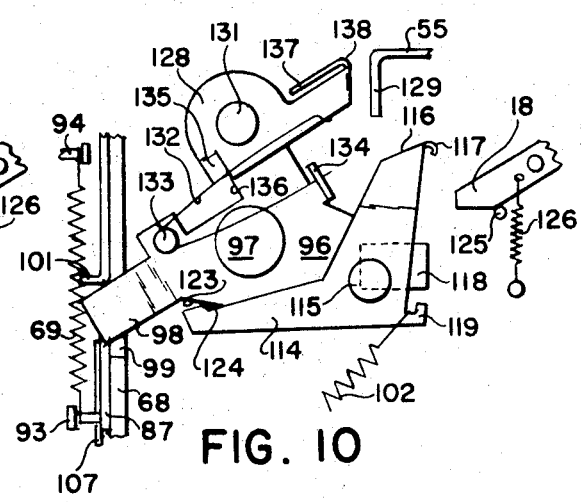
FIG. 10 corresponds to FIGS. 8 and 9 and shows the illustrated components when the shutter trigger has been depressed fully.

As the shutter trigger is depressed, ear 101 of latch member 87 moves arm 98 downwardly, pivoting member 96 in a counterclockwise direction. Such movement of member 96 rotates pivot member 115 relative to stud 97, thereby sliding lip 116 along projection 118 to position nose 117 beneath shutter lever 18. When member 96 has rotated sufficiently to move edge 123 thereof into engagement with the trailing lip 124 of lever 114, further movement of member 96 raises the nose portion 117 to engage and raise the shutter lever. FIG. 9 shows the relative positions of the various components when nose portion 117 of lever 114 has thus raised the shutter lever sufficiently to operate the shutter. During further depression of the trigger to its lowermost position, as shown in FIG. 10, the continuing upward movement of nose 117 causes it to disengage the end of the shutter lever 18, which is then returned to its initial location in abutment with stop pin 125 by spring 126. When the trigger is released after having been depressed fully, member 96 immediately rotates in a clockwise direction under the influence of spring 102, as explained earlier. During such return movement, nose 117 of lever 114 engages the sloping top edge of the shutter lever but bypasses such engagement by rocking lever 114 to the position shown in FIG. 11, in which trailing lip 124 has moved out of contact with edge 123. When the nose portion of the intermediate lever has moved past the shutter lever, lip 116 reengages support projection 118 and the various components reassume the relative positions shown in FIG. 8.

IMPACT RESET MECHANISM

After an exposure has been made in response to depression of the trigger, it is necessary to restore the mechanism to the condition shown in FIG. 2 in order that the film will be advanced to align the next exposure area with the lens system; whereupon the trigger is again operable. This is accomplished by means of the resetting device shown in FIGS. 1 and 8 through 11, comprising a return lever 128 and a depending return ear 129 on latch arm 53. As is most clearly shown in FIGS. 8 through 11, the return lever 128 is pivotally attached to shutter-operating member 96 at pivot 131 and is biased in a counterclockwise direction relative to member 96 by a hairpin spring 132, passing around a stud 133 and engaged at its respective opposite ends, with the return lever and with an ear 134 on member 96. An inwardly bent tongue 135 on the return lever limits its counterclockwise movement to the position shown in FIG. 8, by abutting against the adjacent edge surface 136 of member 96.

Figure 8:
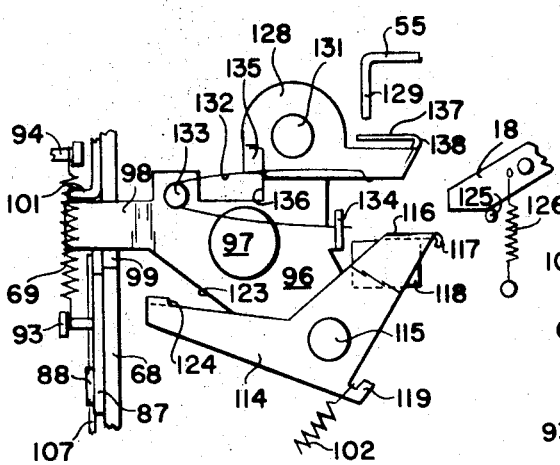
FIG. 8 is an enlarged front plan view of the shutter operating mechanism and associated elements to reset the metering and double-exposure mechanism, with the illustrated components shown in their respective positions prior to depression of the shutter trigger to effect exposure.
Figure 9:
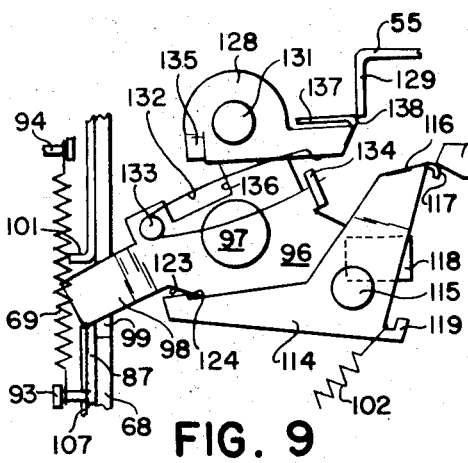
FIG. 9 corresponds to FIG. 8 and shows the illustrated components during depression of the shutter trigger.

When the mechanism is at the stage of the operating cycle shown in FIG. 2, just prior to depression of the trigger, the depending return ear 129 on the latch arm 53 is at its extreme left position, in the relation to the shutter-operating mechanism shown in FIG. 8. When the trigger is depressed, member 96 is pivotally moved progressively to the position shown in FIGS. 9 and 10, as previously described. During such movement, the upper surface 137 on projecting portion 138 of the return lever 128 engages the lower edge of depending return ear 129, which, being immovable in an upward direction, causes the return lever to rotate about pivot 131 against the influence of spring 132, as shown in FIG. 9. As the depression of the trigger continues, the return lever disengages depending return ear 129 and reassumes its initial relation to member 96, as shown in FIG. 10, without having altered the position of the latch arm 53. Hence, when the trigger has reached its fully depressed position, thereby effecting an exposure of the film, the latch arm 53 and the metering and double-exposure prevention systems associated therewith still remain as shown in FIG. 3.

Figure 11:
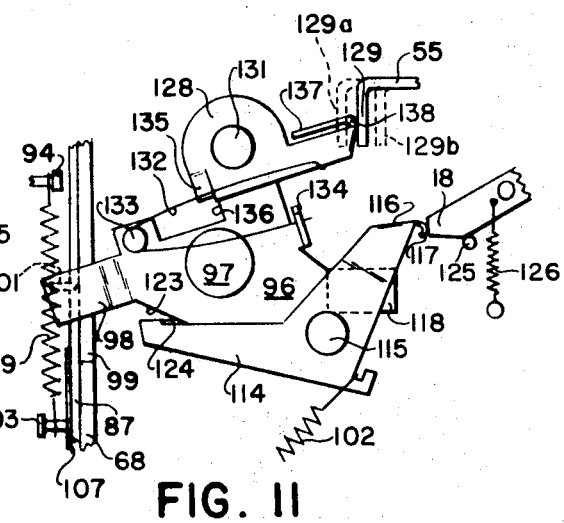
FIG. 11 corresponds to FIGS. 8, 9 and 10 and shows the illustrated components during return of the shutter trigger from its fully depressed position to the extended position shown in FIG. 8.

When the trigger is released, its initial upward movement causes member 96 to rotate rapidly in a clockwise direction regardless of the speed of movement of the trigger member, as was explained previously. The projecting portion 138 of the return lever is spaced from depending return ear 129 when such clockwise rotation of member 96 commences, as shown in FIG. 10. Accordingly, it will be apparent that considerable momentum is developed in member 96 and levers 114 and 128 before projecting portion 138 of the latter impacts against the depending return ear, under the combined force of such momentum and the tension of spring 102. When such impact occurs, the return lever cannot rotate in a counterclockwise direction because of the abutment of tongue 135 against edge surface 136. Therefore, as shown in FIG. 11, the depending return ear 129 is driven almost instantaneously from the position shown in broken lines at 129a to the position similarly depicted at 129b, by means of a predetermined force of sufficient magnitude to overcome positively the friction between pawl tooth 65 and the ratchet wheel 32 as well as the resistance of spring 63. As the latch arm is thus returned to the position shown in FIG. 2, depending ear 56 is moved slightly past upwardly projecting ear 58 on resilient tongue member 52, allowing that ear to retain the latch arm temporarily out of engagement with the ratchet wheel as the return lever disengages depending ear 129 and returns to the position shown in FIG. 8.

The invention has been described with particular reference to the preferred embodiment thereof, but it will be understood by those skilled in the art that variations and modifications can be effected within the scope and spirit of the invention as described hereinabove and as defined in the appended claims.

We claim:

1. In a camera using an elongate strip of photographic film, said camera including image-forming means operable to make an exposure, film-advancing means to advance said strip, advancement-blocking means movable to an operative position disabling said film-advancing means after advancement of said strip, and a trigger member movable to operate the image-forming means, the improvement comprising:
   a. a trigger-blocking member movable between
      i. a blocking position in which said trigger-blocking member is engageable with said trigger member to block movement thereof and prevent operation of the image-forming means and
      ii. a retracted position in which said trigger-blocking member is out of engageable relation with said trigger member, and
   b. trigger-blocking control means comprising resilient means adjustable by said advancement-blocking means
      i. to resiliently bias said trigger-blocking means toward said blocking position while said advancement-blocking means is out of the operative position and
      ii. to resiliently bias said trigger-blocking member toward said retracted position while said advancement-blocking means is in the operative position.

2. The invention defined by claim 1 in which said trigger-blocking control means comprises:
   a. a first resilient member constantly applying to said trigger-blocking member a resilient force urging said trigger-blocking member toward one of said positions,
   b. a second resilient member adjustable
      i. to a first condition in which said second resilient member is ineffective to prevent said first resilient member from biasing said trigger-blocking member toward said one position and
      ii. to a second condition in which said second resilient member opposes said first resilient member and is effective to bias said trigger-blocking member toward the other of said positions, and
   c. adjusting means for adjusting said second resilient member in response to movement of said advancement-blocking means.

3. The invention defined by claim 2 in which said first resilient member urges said trigger-blocking member toward said retracted position.

4. In a camera according to claim 1, the further improvement comprising:
   a. a reset member movable between a cocked position and a released position,
   b. spring means resiliently urging said reset member toward said released position,
   c. latch means for operatively connecting said reset member with said trigger member during movement of said trigger member to move said reset member from said released position to said cocked position against the influence of said spring means,
   d. latch release means for operatively disconnecting said reset member from said trigger member in response to movement of said trigger member after operation of the image-forming means to allow said spring member to move said reset member from said cocked position to said released position independently of said trigger member, and
   e. abutment means for connecting said reset member with said advancement-blocking means during movement of said reset member from said cocked position to said released position to move said advancement-blocking means out of said operative position.

5. A photographic camera comprising:
   a. a film advance mechanism including an advancement-blocking member movable between an operative position disabling the film advance mechanism and an inoperative position,
   b. a trigger member movable to make an exposure,
   c. a trigger-blocking member movable between an inoperative location and an operative location in engagement with said trigger member to prevent movement thereof,
   d. resilient means adjustable
      i. to a first condition to bias said trigger-blocking member toward said inoperative location and
      ii. to a second condition to bias said trigger-blocking member toward said operative location, and
   e. adjusting means responsive to movement of said advancement-blocking member for adjusting said resilient means
      i. to said first condition upon movement of said advancement-blocking member to said operative position and
      ii. to said second condition upon movement of said advancement-blocking member to said inoperative position.